No. 769,319.

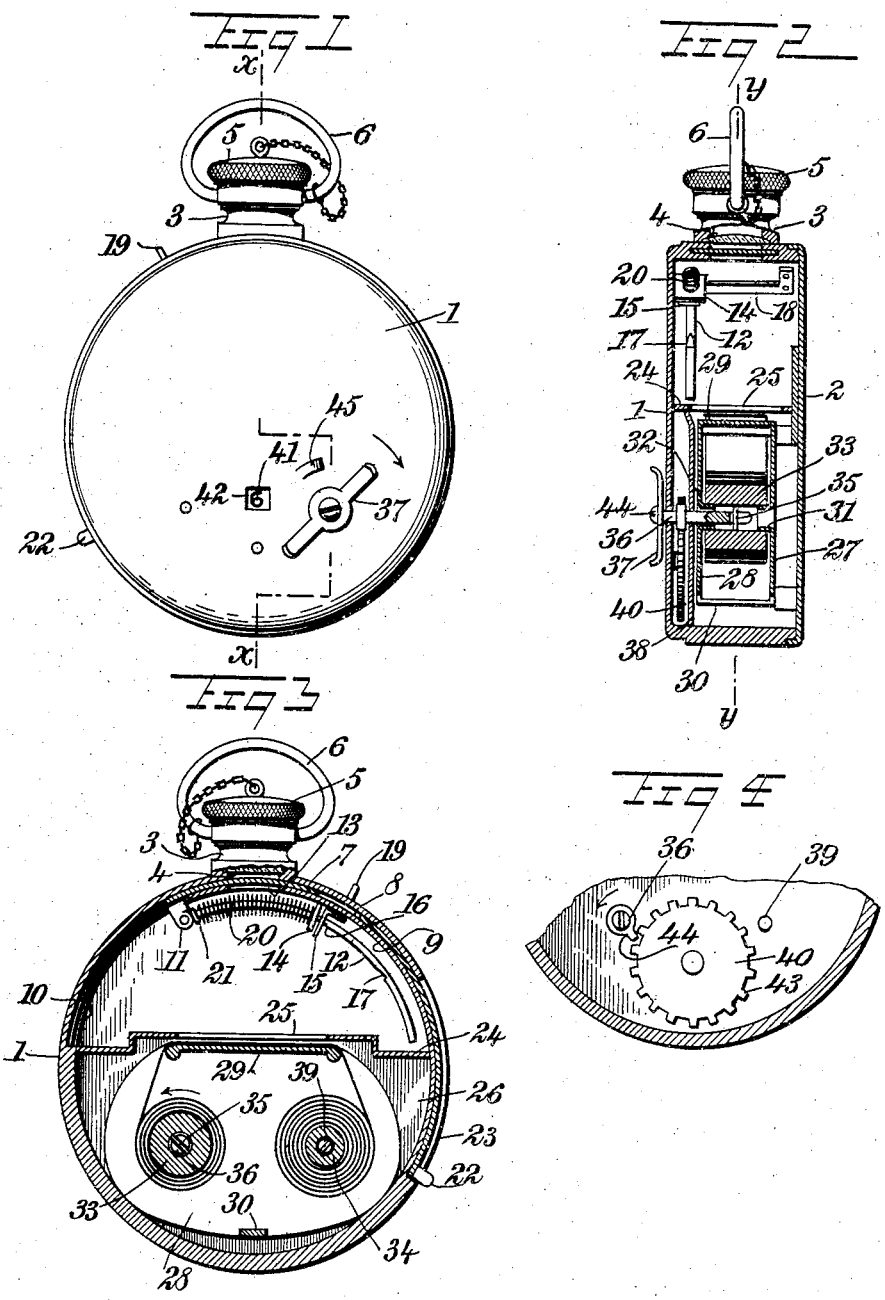

Patented September 6, 1904.

UNITED STATES PATENT OFFICE.

MAGNUS NIÉLL, OF NEW YORK, N. Y., ASSIGNOR OF ONE-HALF TO THOMAS WALLACE, OF NEW YORK, N. Y.

PHOTOGRAPHIC CAMERA.

SPECIFICATION forming part of Letters Patent No. 769,319, dated September 6, 1904.

Application filed October 14, 1903. Serial No. 176,994. (No model.)

*To all whom it may concern:*

Be it known that I, MAGNUS NIÉLL, a subject of the King of Sweden and Norway, and a resident of the city of New York, borough of Manhattan, in the county and State of New York, have invented a new and Improved Photographic Camera, of which the following is a full, clear, and exact description.

This invention relates to improvements in photographic cameras, an object being to provide a camera of novel form and construction and of a size to be readily carried in a vest-pocket.

A further object is to provide a novel film-strip holder, with means for operating the same to move the strip, whereby new or unexposed surfaces are brought to exposure position.

I will describe a photographic camera embodying my invention and then point out the novel features in the appended claims.

Reference is to be had to the accompanying drawings, forming a part of this specification, in which similar characters of reference indicate corresponding parts in all the figures.

Figure 1 is a plan view of a photographic camera embodying my invention. Fig. 2 is a section on the line $x\ x$ of Fig. 1. Fig. 3 is a section on the line $y\ y$ of Fig. 2, and Fig. 4 is a sectional detail showing the recording mechanism employed.

Referring to the drawings, 1 designates the casing of the camera, which is substantially in the form of a watchcase, and, in fact, is designed to simulate a watchcase. At one side the casing is provided with a removable cover 2, and on its periphery it is provided with a lens-tube 3 in the form of a watchcase-stem, and in this tube is a lens 4, and the outer end of the tube is provided with a removable cap 5, and connecting with the tube is a ring 6. Movable across the opening of the lens 4 is a shutter consisting of a segmental plate 7, having an opening 8 and movable between the inner surface of the casing and a plate 9 within the casing.

Extended inward from one end of the shutter and through a slot 10 in the inner plate 9 is a lug 11, to which one end of a curved rod 12 is attached. This inner plate 9, it will be noted, has an opening 13 in line with the lens-tube opening. The rod 12 passes loosely through an opening in a lug 14, extended inward from the plate 9, and it also passes loosely through a slot formed in a latch-plate 15, designed to engage with either one of the shoulders 16 17, formed on the rod. This latch-plate 15 is attached to a spring-plate 18, from the free end of which a finger-piece 19 extends outward through an opening in the casing. Surrounding the rod 12 is a spring 20. This spring bears at one end against a collar 21 on the rod adjacent to the lug 11, and at the other end the said spring engages with the lug 14. The object of this spring is to move the shutter to closing position, as will be hereinafter described.

The shutter has at one end a lug 22, which extends outward through an opening 23 in the periphery of the casing. Extended transversely in the casing is a partition 24, provided with an exposure-opening 25, which obviously is in line with the lens. The said partition forms one wall of a chamber 26, in which the holder or magazine for the sensitized strip or film is placed. These holders, with the strips thereon, are designed to be purchased as a complete article, whereby a new one may be placed in the camera when all the surfaces of a previous strip shall have been exposed. In order to be able to load and unload the camera in daylight, the ends of the film-strip are made light-proof.

The holder comprises upper and lower plates 27 28, connected at the front by a plate 29, over which the sensitized strip passes, the said plate 29 being rearward of the opening 25 and opposite the partition 24, and the said plates 27 and 28 are connected by a narrow post 30. The said plates 27 and 28 are provided with inwardly-extended tubular lugs 31 32, which may be formed by pressing in portions of the plates. These lugs form bearings for the take-up spool 33 and the let-off spool 34. Arranged within the spool 33 is a cross-pin 35, designed to engage in an outwardly-opening notch formed in a spindle 36, which extends outward through the bottom or back plate of the casing, where it is provided with a turning-handle 37, it being understood that the said spindle has rotary motion. This spindle not only has a bearing in a wall of the casing, as above described, but also has a bearing in a plate 38, which forms the base upon which the film-strip holder rests. Extended inward from said plate 38 is a short pin 39, designed to pass into the spool 34, which, with the spindle 36, holds the film-strip holder in proper position in the chamber 26. It will be noted that the spool 34 has a cross-pin similar to the cross-pin in the spool 33. This is for convenience in manipulating the parts when the film is first placed in the holder, and it is not in any manner engaged with the said pin 39.

Mounted to rotate between the plate 38 and the adjacent wall of the casing is a tally or recording wheel 40. This wheel is provided with numbers 41, designed to be seen consecutively through a sight-opening 42, formed in the casing-wall, the numbers of course being designed to indicate the number of exposures made. The wheel 40 is provided with peripheral teeth 43, designed to be engaged by a finger 44, connected to the spindle 36.

In the operation when it is desired to make an instantaneous exposure the shutter is to be moved until its end or the lug 22 engages against the end of the slot 23. Then after removing the end of the cap 5 the finger 19 is to be pressed inward, releasing the shoulder 16 of the rod 12 from the plate 15. Then the compressed spring 20 will move the shutter toward its closed position, and when its opening 8 passes rapidly across the lens-tube the exposure will be made. Before the exposure of course the film-spools must be turned until the numeral "0" is seen through the opening 42. When the next exposure is to be made, the turning-handle 37, connected with the spindle 36, carrying the spool 33, is to be turned one-half a revolution, which will bring a new part of the film-strip into exposure position. The size of the spool 33 is such that its circumference is equal to double the size of the exposure-opening 25 in the partition 24. The turning of the handle 37 also imparts movement to the wheel 40, thus bringing a new numeral into view, indicating the number of exposures. When a time-exposure is to be made, the shutter is to be moved until the shoulder 17 engages with the latch-plate 15. At this time the opening 8 will be in line with the lens-tube opening. Upon removing the cap 5 the exposure will be made for the desired length of time, and then upon pressing the finger-piece 19 the shutter will be moved to close the opening. The spindle 36 is prevented from backward rotation by means of a spring 45, arranged in the path of the arm 37. This spring is pressed out of the metal forming the casing in such manner as to permit the arm 37 to pass readily over it when moving in the right direction.

Having thus described my invention, I claim as new and desire to secure by Letters Patent—

1. A photographic camera comprising a circular casing closed at the top and bottom, a lens-holder extended from the periphery of the casing, a film-holder in the casing consisting of opposite plates secured together, spools mounted to rotate between the plates, a spindle extended through a wall of the casing and engaging with one of the spools, the said wall of the casing having a sight-opening, a recording-wheel in the casing and having numerals adapted to be seen through said opening, and means carried by the spindle for imparting rotary motion to said wheel.

2. A photographic camera comprising a casing, a lens arranged in the periphery thereof, a shutter movable across said lens, a film-strip holder comprising opposite plates having inwardly-extended tubular lugs, said plates being connected at opposite edges, spools mounted to rotate on said lugs, one of said spools having an interior cross-pin, a spindle passing into the casing and having a slotted end to receive said pin, a recording device operated by the spindle, and a turning-finger on the outer end of said spindle.

3. A photographic camera comprising a casing, a lens and a shutter therefor, a film-holder comprising opposite plates secured together at their opposite edges, lugs extended inward from said opposite plates, spools mounted to rotate on said lugs, a cross-pin arranged in one of the spools, a spindle extended through a wall of the casing and having a slotted end for receiving said pin, the said wall of the casing being provided with a sight-opening, a recording-wheel arranged in the casing and having numerals adapted to be seen through said sight-opening, peripheral teeth on said wheel, and a finger on said spindle for engaging with said teeth.

In testimony whereof I have signed my name to this specification in the presence of two subscribing witnesses.

MAGNUS NIÉLL.

Witnesses:
  JNO. M. RITTER,
  C. R. FERGUSON.